(12) United States Patent
Kuchenski et al.

(10) Patent No.: US 12,182,782 B2
(45) Date of Patent: *Dec. 31, 2024

(54) TOKEN BASED TRANSACTIONS

(71) Applicant: Diebold Nixdorf, Incorporated, North Canton, OH (US)

(72) Inventors: David William Kuchenski, Tallmadge, OH (US); Douglas Kurt Hartung, Kingwood, TX (US)

(73) Assignee: Diebold Nixdorf, Incorporated, North Canton, OH (US)

(*) Notice: Subject to any disclaimer, the term of this patent is extended or adjusted under 35 U.S.C. 154(b) by 281 days.

This patent is subject to a terminal disclaimer.

(21) Appl. No.: 17/320,494

(22) Filed: May 14, 2021

(65) Prior Publication Data

US 2021/0272081 A1 Sep. 2, 2021

Related U.S. Application Data

(62) Division of application No. 15/537,776, filed as application No. PCT/US2015/067011 on Dec. 21, 2015, now Pat. No. 11,042,851.

(60) Provisional application No. 62/094,320, filed on Dec. 19, 2014.

(51) Int. Cl.
| | |
|---|---|
| G06Q 20/10 | (2012.01) |
| G06Q 20/32 | (2012.01) |
| G06Q 20/36 | (2012.01) |
| G06Q 20/38 | (2012.01) |
| G07F 19/00 | (2006.01) |

(52) U.S. Cl.
CPC ......... *G06Q 20/1085* (2013.01); *G06Q 20/32* (2013.01); *G06Q 20/363* (2013.01); *G06Q 20/3821* (2013.01); *G07F 19/203* (2013.01); *G07F 19/206* (2013.01)

(58) Field of Classification Search
CPC .............................................. G06Q 20/00-425
USPC ..................................................... 705/50–79
See application file for complete search history.

(56) References Cited

U.S. PATENT DOCUMENTS

| | | | |
|---|---|---|---|
| 5,386,104 A * | 1/1995 | Sime | G06F 18/00 235/382 |
| 7,416,112 B2 | 8/2008 | Smith et al. | |
| 8,423,462 B1 * | 4/2013 | Amacker | G06Q 20/36 705/41 |
| 2002/0097715 A1 * | 7/2002 | Roerick | G06Q 40/02 370/389 |
| 2003/0069856 A1 * | 4/2003 | Seifert | G06Q 40/02 705/73 |
| 2008/0203150 A1 | 8/2008 | Winston | |

(Continued)

FOREIGN PATENT DOCUMENTS

| | | |
|---|---|---|
| EP | 2704116 | 3/2014 |
| WO | 02/095696 A1 | 11/2002 |

OTHER PUBLICATIONS

International Search Report dated May 4, 2016 for corresponding PCT application; 16 pages.

*Primary Examiner* — Chenyuh Kuo
(74) *Attorney, Agent, or Firm* — Black McCuskey

(57) ABSTRACT

In an example embodiment, there is described in here a method for pre-staging transactions that permit a banking customer to either transfer money to a third party or to themselves. In particular embodiments, a token is generated that can be used multiple times by the recipient.

12 Claims, 11 Drawing Sheets

(56) References Cited

U.S. PATENT DOCUMENTS

| | | | |
|---|---|---|---|
| 2012/0160912 A1* | 6/2012 | Laracey | G06Q 20/3274 |
| | | | 235/379 |
| 2012/0223134 A1 | 9/2012 | Smith et al. | |
| 2013/0124411 A1* | 5/2013 | Kobres | G06Q 40/02 |
| | | | 235/379 |
| 2014/0095383 A1* | 4/2014 | Rao | G06Q 20/363 |
| | | | 705/43 |
| 2014/0172703 A1 | 6/2014 | Black | |
| 2015/0106267 A1* | 4/2015 | Lee | G06Q 20/42 |
| | | | 705/44 |
| 2015/0254655 A1* | 9/2015 | Bondesen | G06Q 20/3821 |
| | | | 705/72 |
| 2016/0027005 A1* | 1/2016 | Kurian | G06Q 20/36 |
| | | | 235/379 |
| 2016/0162855 A1* | 6/2016 | Johnson | G06Q 20/405 |
| | | | 705/43 |
| 2016/0321625 A1* | 11/2016 | Gilliam, III | G06Q 20/10 |

* cited by examiner

TOKEN BASED TRANSACTIONS

CROSS-REFERENCE TO RELATED APPLICATIONS

This application claims the benefit under 35 U.S.C. § 371 to international application PCT/US2015/67011 filed on 21 Dec. 2015 that claims the benefit of U.S. Provisional Patent Application No. 62/094,320 filed 19 Dec. 2014, the contents of the aforementioned applications are hereby incorporated by reference in their entirety.

BACKGROUND

This relates in general to systems for providing financial services and transactions.

These systems may generally include certain stand-alone machines. For one example, one such known system is the Automated Transaction Machine (ATM).

One category of ATM includes machines capable of conducting a wide variety of traditional banking transactions including acceptance of cash and/or checks for deposit, check cashing, and withdrawals/dispensing of cash, also referred to herein as currency or notes.

Currency/notes, checks and other sheet materials, generally referred to as documents, that are accepted and/or dispensed by an ATM, are typically housed in containers, such as bins or removable cassettes, while documents are stored in the machine. Typically, documents are dispensed from cassettes and presented by an ATM through an aperture or opening in a user interface, typically in the front facing or top of a housing of the ATM. In some ATMs, documents may be accepted through the user interface for deposit and the like and then placed into a cassette.

SUMMARY

This relates more specifically to cardless systems for financial services and transactions.

An embodiment enables a first party to pre-stage a one-time ATM transaction to dispense a fixed amount of currency, wherein the pre-staged transaction can be initiated by a second party by inputting a token, e.g., an alphanumeric character string, into an ATM configured to receive it. Because the second party only needs a token and an ATM configured to receive the token to initiate the pre-staged transaction, this embodiment allows an ATM transaction to be initiated by a party without using a debit card or mobile phone.

In another embodiment, a first party pre-stages a one-time ATM transaction to dispense a variable amount of currency, wherein the pre-staged transaction can be initiated by a second party by inputting a token into an ATM configured to receive it. The second party inputs, into the ATM, the currency amount to be dispensed by the ATM at about the same time as inputting the token into the ATM.

In another embodiment, the token that is generated as a result of a first party pre-staging multiple ATM transactions is a reusable token that can be used repeatedly to initiate a pre-staged transaction. In this embodiment, a first party pre-stages a plurality of ATM transactions to dispense a fixed or variable amount of currency, wherein the pre-staged transactions can be initiated by a second party by entering a reusable token into an ATM configured to receive it. In the variable-currency embodiment, the first party inputs, into the ATM, the currency amount to be dispensed by the ATM at about the same time as entering the reusable token into the ATM.

In another embodiment, a first party pre-stages a fixed-amount or variable-currency ATM transaction, wherein the pre-staged transaction can be initiated by a second party by entering a token into an ATM configured to receive it. In this embodiment, the token's life span is for a fixed amount of time, e.g., 15 minutes or 3 days; alternatively, the token's life span is for a fixed number of uses, e.g., 1 time or 5 times.

In another embodiment, a first party pre-stages a one-time ATM transaction to dispense a variable amount of currency, wherein the pre-staged transaction can be initiated by the first party by entering a token into an ATM configured to receive it. Because the first party only needs a token and an ATM configured to receive the token to initiate the transaction, this embodiment allows an ATM transaction to be initiated by a party without using a debit card or mobile phone.

In another embodiment, a first party pre-stages a one-time ATM transaction to dispense a variable amount of currency, wherein the pre-staged transaction can be initiated by the first party by entering a token into an ATM configured to receive it. The first party inputs, into the ATM, the currency amount to be dispensed by the ATM at about the same time as entering the token into the ATM.

In another embodiment, a first party pre-stages a multiple-use ATM transaction(s) to dispense a variable amount of currency, wherein the pre-staged transaction(s) can be initiated by the first party by entering a reusable token into an ATM configured to receive it. The first party inputs, into the ATM, the currency amount to be dispensed by the ATM at about the same time as entering the reusable token into the ATM.

In another embodiment, a first party pre-stages a fixed-amount or variable-currency ATM transaction, wherein the pre-staged transaction can be initiated by the first party by entering a token into an ATM configured to receive it. In this embodiment, the token's life span is for a fixed amount of time, e.g., 15 minutes or 3 days; alternatively, the token's life span is for a fixed number of uses, e.g., 1 time or 5 times.

This embodiment allows a first party or entity to pay multiple second parties fixed amounts of currency using pre-staged ATM transactions using a plurality of independent financial tokens in place of traditional checks or cash. In this embodiment, a first party pre-stages a plurality of one-time ATM transactions wherein each transaction is pre-staged to dispense a fixed amount of currency, wherein each pre-staged transaction can be initiated by a second party by entering its respective token, e.g., an alphanumeric character string, into an ATM configured to receive it.

This technology allows a first party to set up a repeating pre-staged fixed-amount of currency that can be withdrawn by a second party using a reusable token. Associated with the token is a regular time interval that allows the token redeemer to receive the fixed amount of currency per time, e.g., once per a week like a child's weekly allowance.

An additional embodiment that could be used in any of the above embodiments includes using a biometric reading in place of an alphanumeric token to initiate a pre-staged ATM transaction.

This embodiment enables a user, having a pre-staged variable-amount-of-currency transaction associated with a biometric token, to execute a point-of-sale transaction by using a fingerprint to initiate the transaction and allowing the vendor to populate the currency amount. The currency is then transferred from the account associated with the pre-staged transaction and then directly or indirectly into the vendor's account, where it is deposited.

DETAILED DESCRIPTION

Methods and system embodiments for pre-staging and initiating a pre-staged financial transaction are described in the context of computer-readable logic executed by one or more general-purpose computers. For example, in a portion of an embodiment, computer readable logic is stored on a server computer system and accessed by a client computer via a communications link or a network, such as an intranet, Internet, or another computer network. And because the basic structures and functions related to computer-readable routines and corresponding implementations are known, they have not been shown or described in detail here to avoid unnecessarily obscuring the described embodiments.

Details are set forth in the following description and in FIGS. 1-10 to provide a thorough understanding of various embodiments of the invention. Those of ordinary skill in the art will understand, however, that the invention may have additional embodiments which may be practiced without several of the details described below. In other instances, those of ordinary skill in the art will appreciate that the methods and systems described herein can include additional details without departing from the spirit or scope of the disclosed embodiment. Additionally, some known structures and systems associated with automated teller machines (ATMs), mobile devices, and associated computer networks have not been shown or described in detail below to avoid unnecessarily obscuring the description of the invention's various embodiments.

In the following figures, identical reference numbers identify identical or at least generally similar elements. In the flow diagrams, a rectangle represents a process, task, action, or operation; a diamond presents a question; and a parallelogram shows input or output.

Figure 1:
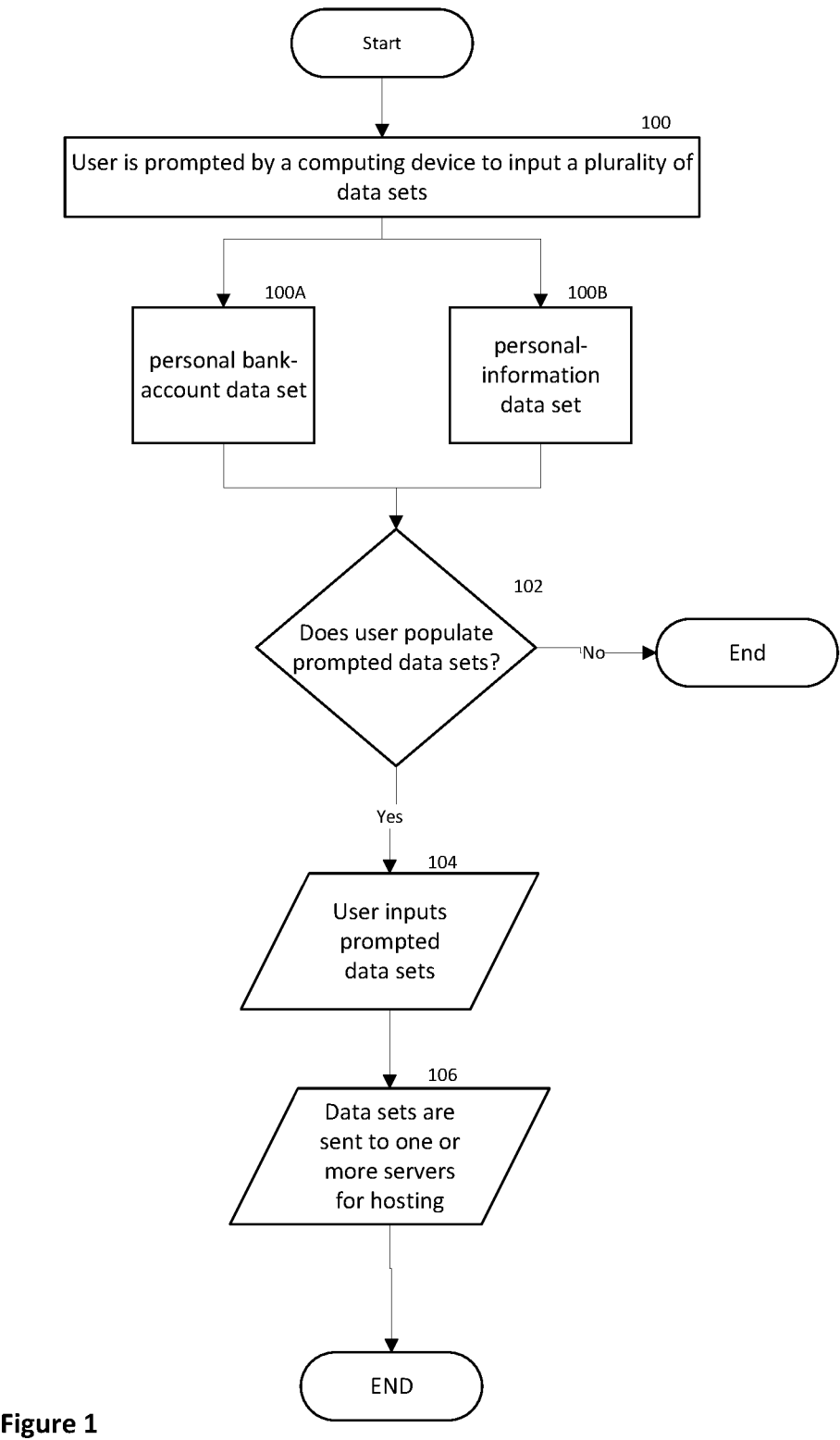
FIG. 1 is a flow diagram showing an embodiment of how a user can create a mobile-wallet account.

FIG. 1 is a flow diagram showing an embodiment of how a user can create a mobile-wallet account by using a computing device to input a plurality of required data sets. A mobile-wallet account is a collection of one or more electronic data sets that include bank-account data sets and personal-information data sets. In block 100, the user is prompted to create mobile-wallet account by using computing device 4 (FIG. 9) to input a plurality of data sets that include 1) personal bank-account data set and 2) personal-information data set, shown respectively in blocks 100A and 100B. In decision block 102, the user decides whether to input the prompted data sets. Block 104 shows the user inputting data sets by populating the data fields prompted to the user. In response to populating the prompted data fields, block 106 shows computing device 4 (FIG. 9) sending mobile-wallet account to server 16 (FIG. 9) that then forwards mobile-wallet account to one or more servers 17 (FIG. 9) for hosting. In an embodiment, computing device 4 sends mobile-wallet account to server 16 that executes an algorithm on at least a portion of mobile-wallet account and thereby determines the appropriate host-server destination for mobile-wallet account. Mobile-wallet account is then forwarded to the appropriate host server for hosting. In an embodiment, server 16 may have a plurality of host servers 17 to select from, wherein the plurality of host servers 17 are specific as to the type of mobile-wallet account that they each respectively host. For example, servers 17 may respectively host different types of bank-specific accounts or bank-specific data sets, and mobile-wallet account including information about a specific bank is forwarded by server 16 to a dedicated host server 17 for that specific bank or bank data. As an illustrative example, mobile-wallet account relating to ABC bank is sent to a host server 17 dedicated to hosting ABC bank data; mobile-wallet account relating to DEF bank is sent to a host server 17 dedicated to hosting DEF bank data; mobile-wallet account relating to GHI bank is sent to a host server 17 dedicated to hosting GHI bank data; and so on.

Figure 2:
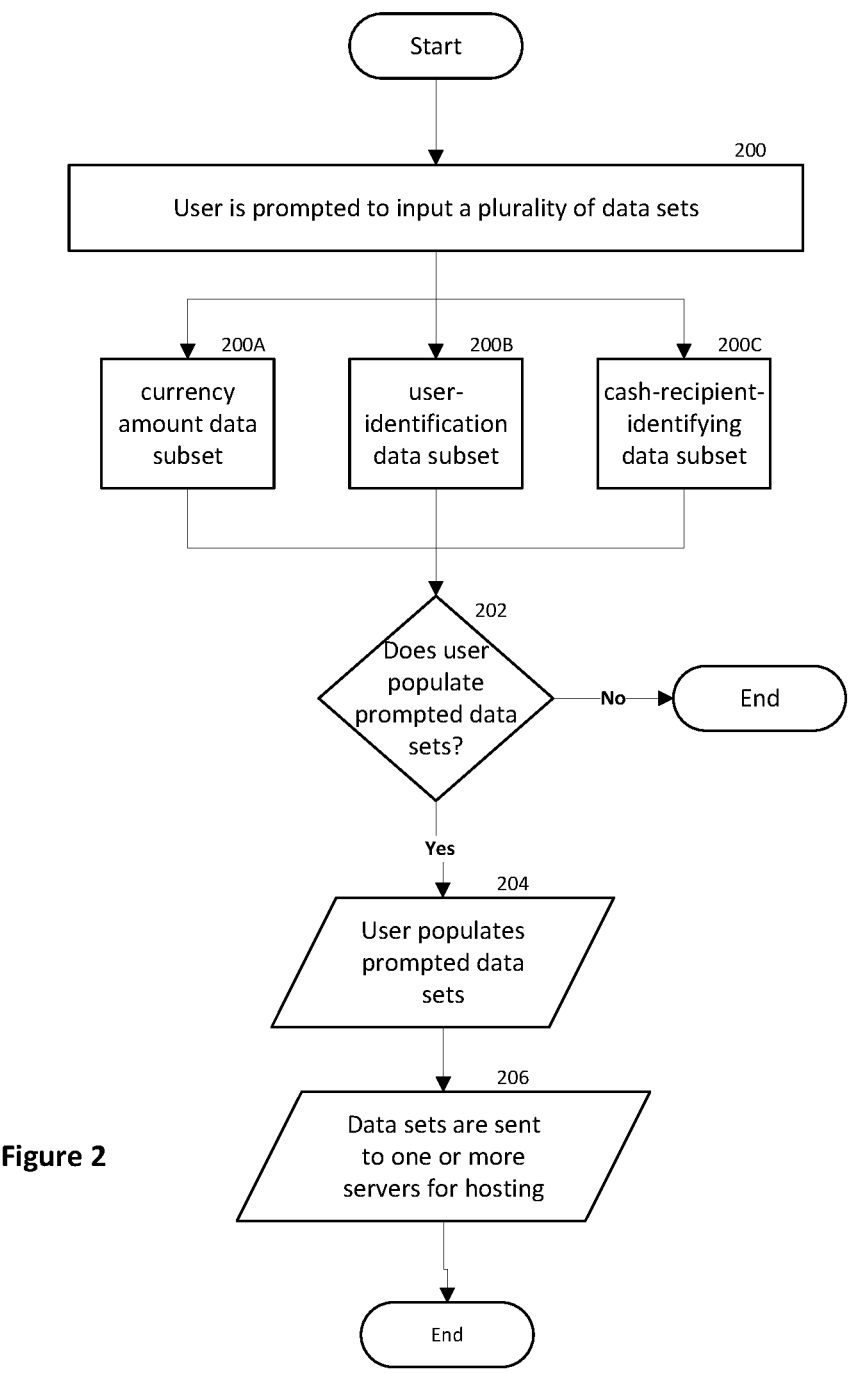
FIG. 2 is a flow diagram showing an embodiment of how a user can pre-stage a financial transaction.

FIG. 2 is a flow diagram showing an embodiment of how a user can pre-stage a financial transaction by creating a financial-transaction data set using computing device 4 (FIG. 9) to input a plurality of required data subsets. A financial-transaction data set is a collection of one or more data subsets that an ATM commonly requires to execute an ATM transaction. A financial-transaction data set can include i) a currency-amount data subset including the currency amount of pre-staged financial transaction, ii) a user-identification data subset that identifies the user; the user-identification data subset may include an alphanumeric user-identifying character string such as a PIN number or a biometric signature, and iii) a currency-recipient-identifying data subset that includes data associated with contacting the designated currency recipient, e.g., currency recipient's mobile-phone number or email address.

Block 200 shows that to create pre-staged financial transaction, the user is prompted create financial-transaction data set by using computing device 4 (FIG. 9) to input a plurality of financial-transaction data subsets respectively shown in blocks 200A, 200B, and 200C; the plurality of data subsets include: i) a currency-amount data subset that includes the currency amount of pre-staged financial transaction, ii) a user-identification data subset that identifies the user; a user-identification data subset may include an alphanumeric user-identifying character string such as a PIN number or a biometric signature, and iii) a currency-recipient-identifying data subset that includes data associated with contacting currency recipient, e.g., a mobile-phone number or an email address of currency recipient. In decision block 202, the user decides whether to input the prompted data subsets. Block 204 shows the user inputting data subsets by populating the data fields prompted to the user. In response to populating the prompted data fields, block 206 shows computing device 4 electronically sending financial-transaction data set to server 16 (FIG. 9) for hosting. In an embodiment, server 16 sends a portion of financial-transaction data set to server 18 (FIG. 9) for hosting.

Figure 3:
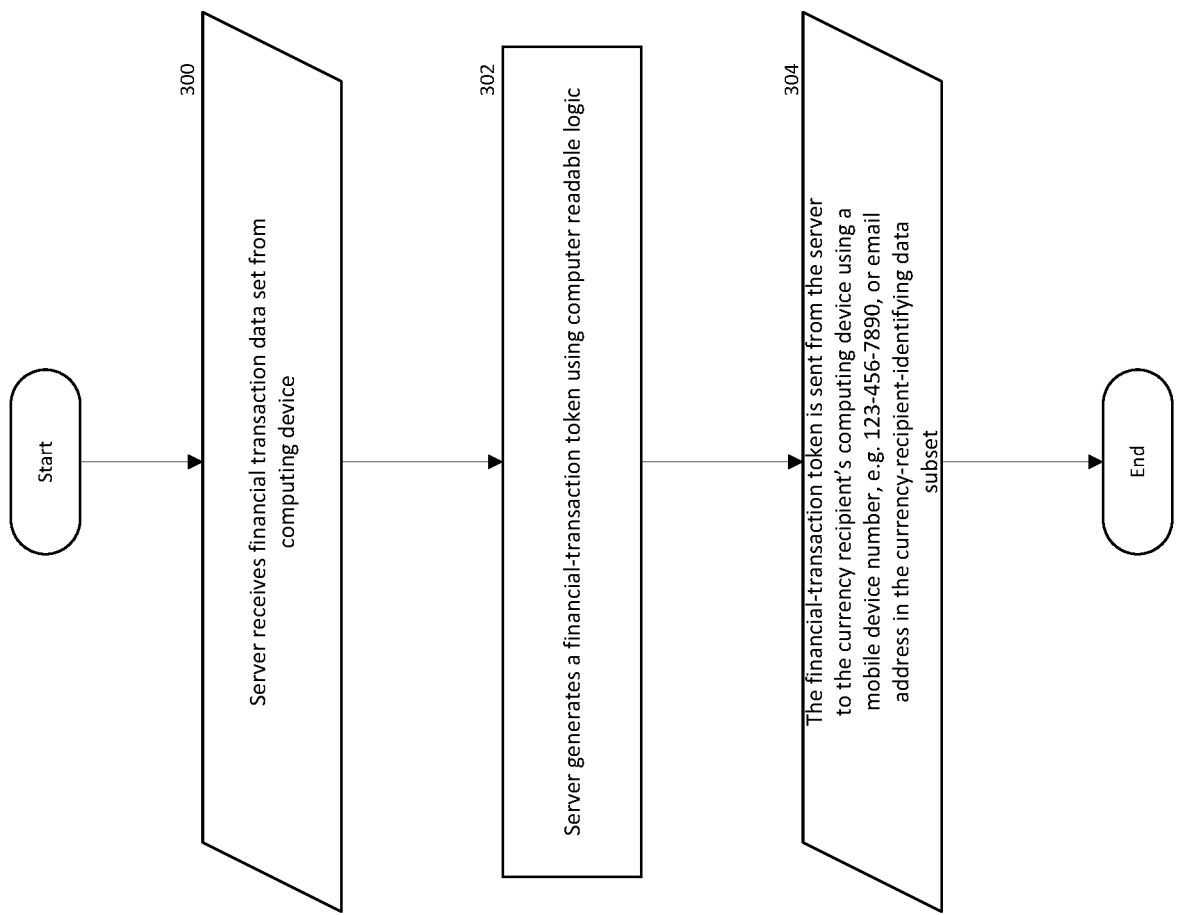
FIG. 3 is a flow diagram showing an embodiment of how a financial-transaction token is created by a server and then sent electronically from that server to the currency recipient via the currency recipient's computing device.
Figure 9:
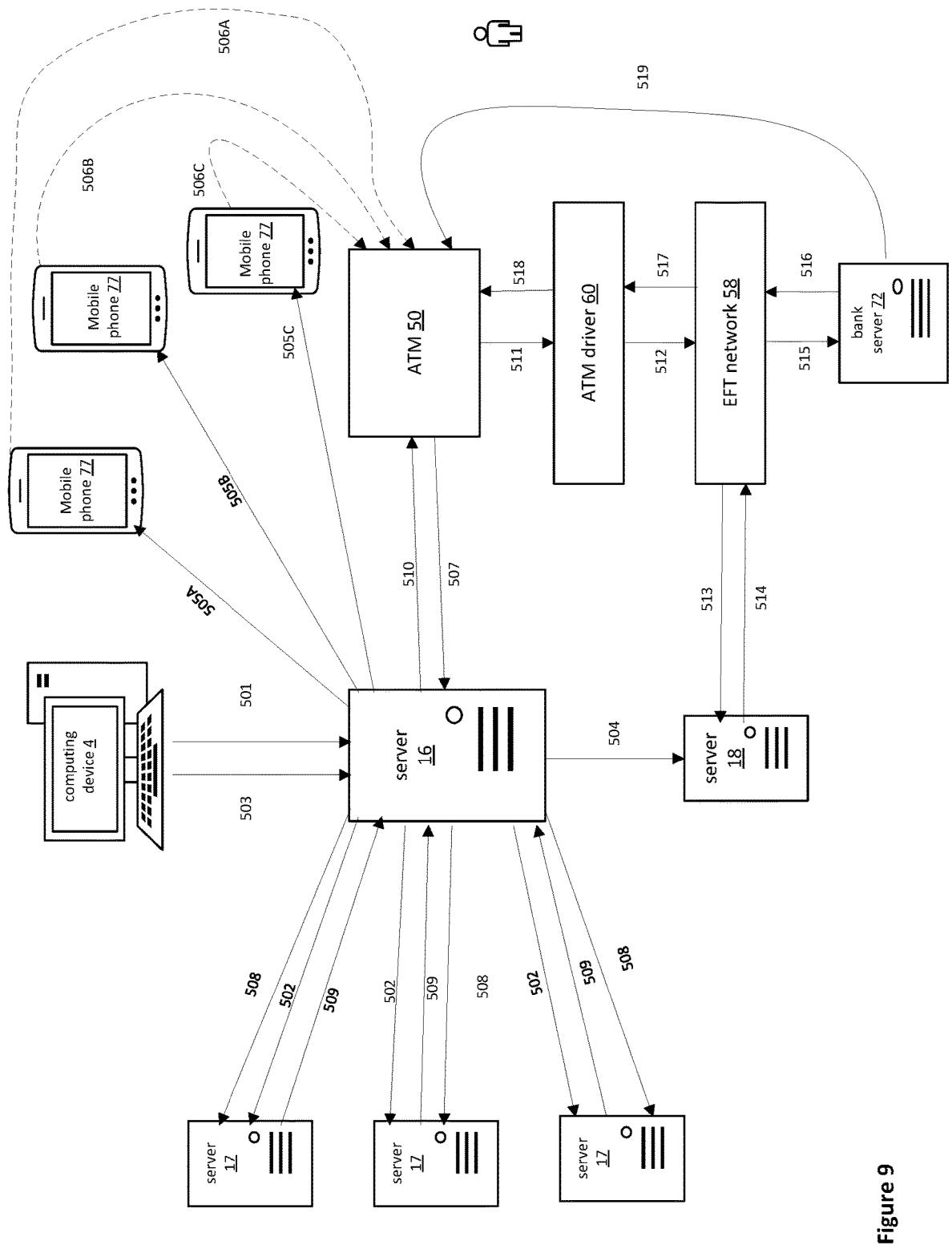
FIG. 9 shows an embodiment directed to a user that has pre-staged a plurality of financial transactions, wherein each pre-staged financial transaction respectively has an independent financial transaction token associated with it.

FIG. 3 is a flow diagram showing an embodiment of how a financial-transaction token is created by a server and then sent electronically from that server to the currency recipient via the currency recipient's computing device. Block 300 shows that server 16 (FIG. 9) receives financial-transaction data set from computing device 4 (FIG. 9). In block 302, server 16 uses computer-readable logic to generate financial-transaction token e.g., an alphanumeric character string that identifies and is associated with financial-transaction data set. In block 304, a financial-transaction token is sent from server 16 (FIG. 9) to the currency recipient's computing device. The financial-transaction token is used at a later time by the currency recipient to help initiate a pre-staged financial transaction; currency recipient initiates the pre-staged financial transaction by inputting the financial-transaction token into an ATM configured to receive tokens. The financial-transaction token figuratively acts as a key that enables ATM 50 to access and receive portions of both a financial-transaction data set and a mobile-wallet account.

Figure 3A:
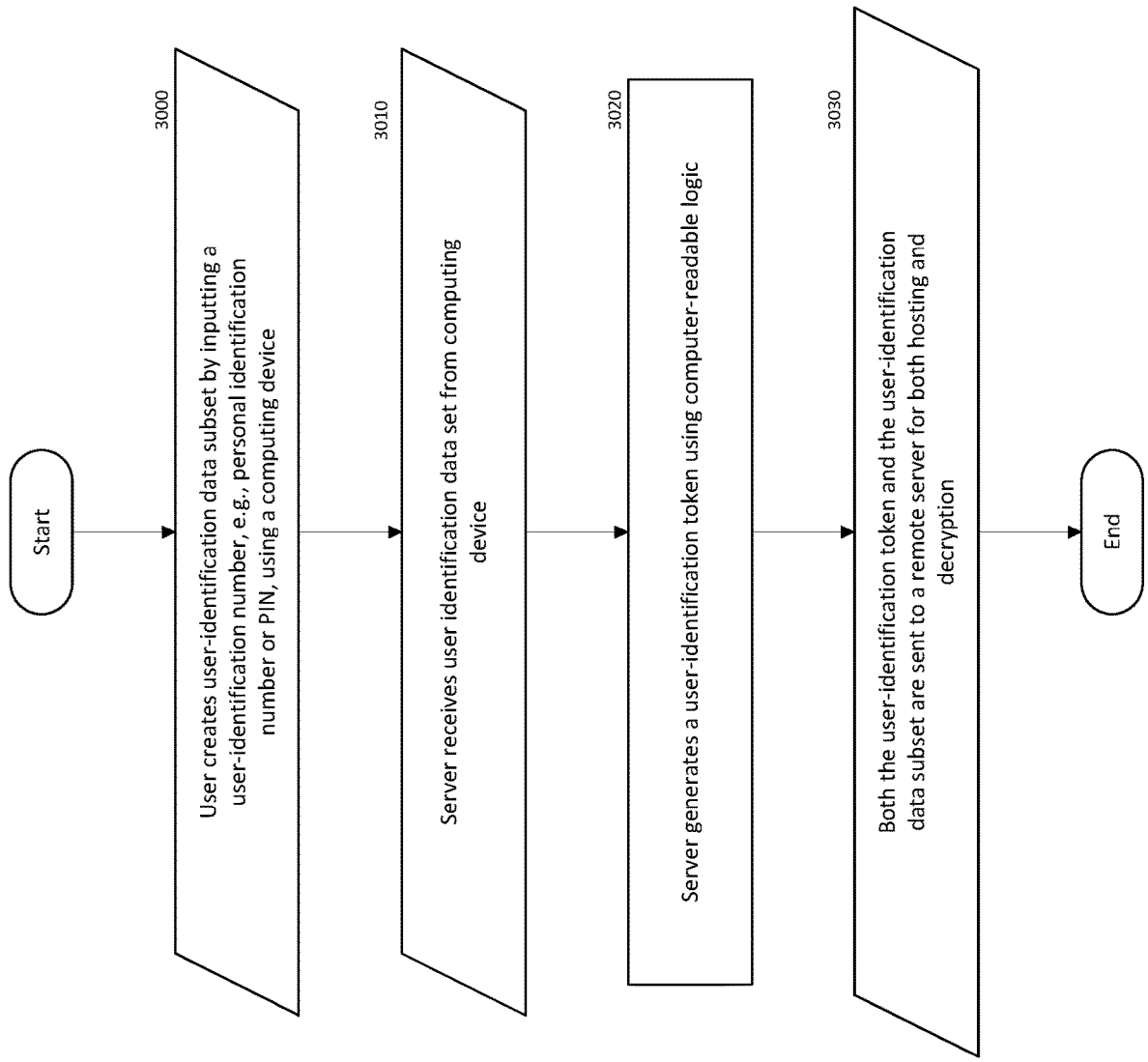
FIG. 3a is a flow diagram showing an embodiment of how a user-identification token is generated.

FIG. 3a is a flow diagram showing an embodiment of how an additional and different type of token called a user-identification token is generated by server 14 in response to server 14 receiving a user-identification data subset. The user-identification token, e.g., an alphanumeric character string, is used later in the process to identify and receive a user-identification data subset or a decrypted version of the user-identification data subset from a remote server. In block 3000, user uses computing device 4 (FIG. 9) to input a user-identification number and thereby create a user-identification data subset. In an embodiment, the user-identification data subset replicates a traditional personal-identification-number signature created as a function of personal-identification-number keystrokes entered by the user. In another embodiment, the user-identification data subset includes vertical and horizontal PIN pad or touch-screen coordinates resulting from a user's keystrokes or touches on a PIN pad or touch-screen display while entering a personal identification number. In response to a PIN pad or touch screen being used, the user-identification data subset includes vertical and horizontal coordinates of the PIN-pad or touch-screen numbers selected by the user. The vertical and horizontal coordinates of the PIN-pad or touch-screen numbers selected by the user can only be decrypted into the actual personal identification number by using a decryption key hosted on server 18 (FIG. 9). Block 3010 shows the user-identification data subset being received from user's computing device 4. Block 3020 shows the server generating a user-identification token by using computer readable logic. The user-identification token is used later in the process to retrieve the decrypted-user-identification data subset. In block 3030, both the user-identification token and user-identification data subset are sent from server 16 (FIG. 9) to server 18 for hosting and decryption. A decrypted user-identification data subset is released from the host server only to a client computer (such as an EFT network) that provides the user-identification token.

Figure 4:
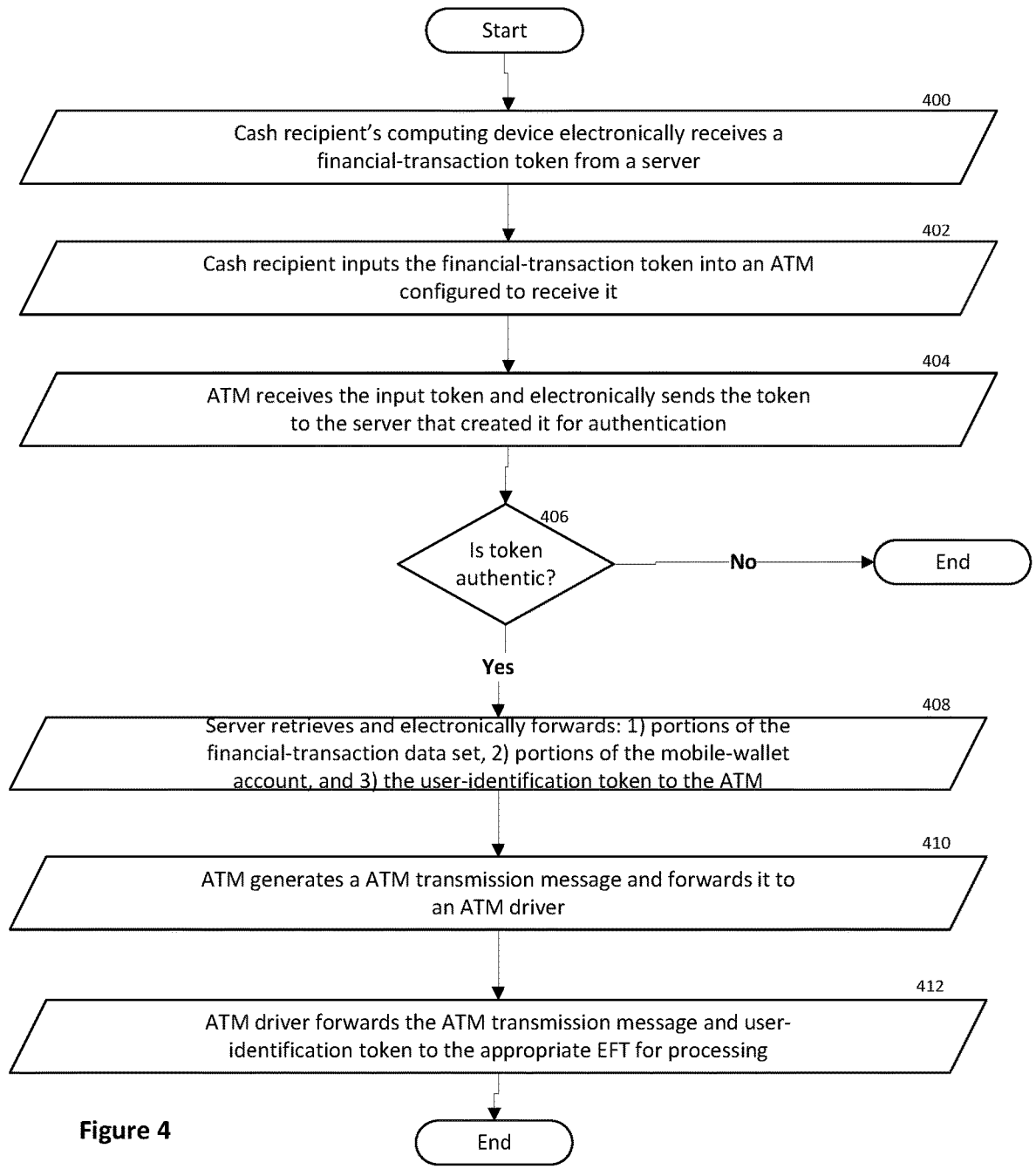
FIG. 4 is a flow diagram showing an embodiment of how a financial-transaction token is processed.

FIG. 4 is a flow diagram showing an embodiment of how i) the cash recipient receives and uses a financial-transaction token to initiate a pre-staged financial transaction at ATM 50 that is configured to a receive token, and ii) how upon authenticating a token received from ATM 50, server 16 (FIG. 9) retrieves and forwards portions of a mobile-wallet account; portions of a financial transaction dataset; and a user-identification token to ATM 50. Upon receiving: the mobile-wallet account; portions of the financial transaction dataset; and the user-identification token, ATM 50 generates an ATM transmission message using those three items and forwards both the ATM transmission message and the user-identification token to ATM driver 60. ATM driver 60 directs the ATM transmission message to the appropriate EFT network 58.

Block 400 shows that the computer readable logic hosted on server 16 (FIG. 9) uses a currency-recipient-identifying data subset to generate and send communication to the currency recipient's computing device 77, e.g., via text or email. The communication is received by computing device 77. The communication includes: i) a financial-transaction token; ii) the currency amount from the currency-amount data sub set; and iii) the identity of the user that created the pre-staged financial transaction. Block 402 shows that in response to receiving the communication, the currency recipient then identifies ATM 50 (FIG. 9) that is configured to receive a financial-transaction token. The currency recipient initiates a pre-staged financial transaction by inputting a financial-transaction token into ATM 50 (FIG. 9) using a data-entry pad or touch-screen display. Blocks 404, 406, and 408 respectively show that in response to inputting a financial-transaction token from a currency recipient, ATM 50 (FIG. 9) electronically submits the financial-transaction token to server 16 (FIG. 9). In response to this electronic submission, server 16 (FIG. 9) authenticates the token using computer-readable logic, and in response to authentication, server 16 (FIG. 9) retrieves and sends portions of the mobile-wallet account, portions of the financial transaction dataset, and the user-identification token associated with the financial-transaction token to ATM 50 (FIG. 9).

In an embodiment not shown in FIG. 4, in response to a financial-transaction token being input into ATM 50 (FIG. 9) by the currency recipient, ATM 50 (FIG. 9) performs a cash-recipient verification step that generates and sends a secondary communication, e.g., via email or text, to the currency recipient in order to authenticate the currency recipient's identity before ATM 50 (FIG. 9) continues with executing the pre-staged financial transaction.

Block 410 shows that in response to receiving portions of a mobile-wallet account, portions of a financial-transaction dataset, and a user-identification token associated with a financial-transaction token from server 16 (FIG. 9), ATM 50 (FIG. 9) generates an ATM transmission message by executing an algorithm on portions of mobile-wallet account, portions of a financial-transaction dataset, and a user-identification token. Upon generating an ATM transmission message, ATM 50 (FIG. 9) then continues to execute the pre-staged financial transaction. ATM 50 (FIG. 9) does this by sending an ATM transmission message in combination with a unique transaction identifier to ATM driver 60 (FIG. 9). In block 412, ATM driver 60 forwards the ATM transmission message and unique transaction identifier to the appropriate electronic-funds-transfer (EFT) network 58. EFT network 58 receives ATM transmission message 56 and a unique transaction identifier from ATM driver 60. EFT network 58 (FIG. 9) forwards the user-identification token (that is included in ATM transmission message 56) to server 18 (FIG. 9). In response to server 18 (FIG. 9) receiving the user-identification token, server 18 authenticates the user-identification token and then sends the decrypted user-identification data subset back to EFT network 58 (FIG. 9).

In response to receiving the decrypted user-identification data subset from server 18 (FIG. 9), EFT network 58 (FIG. 9) then forwards both the decrypted user-identification data subset and portions of an ATM transmission message to bank server 72 (of the proper banking institution) for processing. The decrypted user-identification data subset and portions of the ATM transmission message sent to bank server 72 (from EFT network 58) is formatted in harmony with the normal protocol of known ATM currency-dispensing-transaction information needed by bank server 72 for processing.

The banking institution, via bank server 72 (FIG. 9), either accepts or rejects the transaction, and if accepted, bank server 72 (FIG. 9) sends an acceptance message to ATM 50 (FIG. 9). In response, ATM 50 (FIG. 9) dispenses a currency amount a to currency recipient via known electronic processing methods. But if the banking institution, via bank server 72, rejects the transaction, bank server 72 sends a rejection message to ATM 50. In response, ATM 50 does not disperse currency to the intended currency recipient and the transaction ends.

Figure 5:
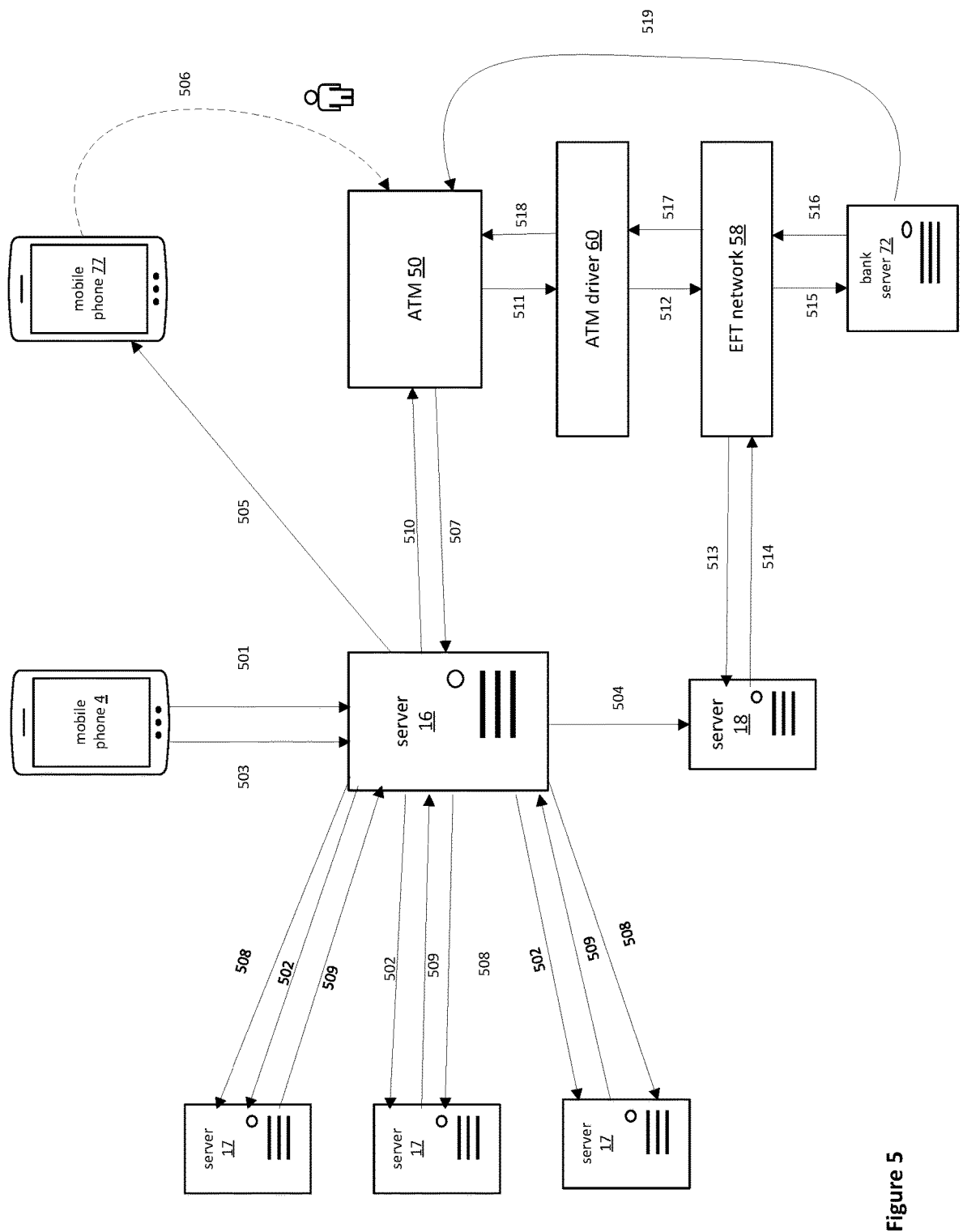
FIG. 5 is a flow diagram showing a universal overview of data transfers throughout the system.

FIG. 5 is a flow diagram showing a universal overview of data transfers throughout the system. Data transfer 501 shows the mobile-wallet account being sent from computing device 4 to server 16. Data transfer 502 shows the mobile-wallet account being sent from server 16 to server 17 for hosting. Data transfer 503 shows the financial transaction data set being sent from computing device 4 to server 16. Data transfer 504 shows a portion of the financial transaction data set being sent from server 16 to server 18 for hosting and decryption. In an embodiment, the portion of the financial-transaction data set that is sent from server 16 to server 18 includes a user-identification data subset. Data transfer 505 shows i) a financial-transaction token, ii) currency amount from a currency-amount of data subset, and iii) the identity of the user that created the pre-staged financial transaction, being sent from server 16 to computing device 77. Data transfer 506 shows cash recipient physically (represented by the dashed line) inputting a financial transaction token into ATM 50; cash recipient receives the financial transaction token from the display of computing device 77. Data transfer 507 shows the financial-transaction token being sent from ATM 50 to server 16. Data transfer 508 shows server 16 requesting mobile-wallet account from server 17. Data transfer 509 shows server 17 sending mobile wallet account to server 16. Data transfer 510 shows server 16 sending a mobile-wallet account, portions of the financial-transaction data set, and the user-identification token to ATM 50. Data transfer 511 shows ATM 50 sending the ATM transmission message to ATM driver 60. Data transfer 512 shows ATM transmission message 56 being sent from ATM driver 60 to EFT network 58. Data transfer 513 shows EFT network 58 sending the user-identification token to server 18. Data transfer 514 shows server 18 sending the decrypted user-identification data subset to EFT network 58. Data transfer 515 shows EFT network 58 sending the decrypted user-identification data subset and portions of the ATM transmission message to bank server 72. Data transfers 516, 517, and 518 show bank server 72 sending a transaction acceptance or rejection message to ATM 50. In an alternate embodiment, bank server 72 sends a direct transaction acceptance or rejection message to ATM 50 via data transfer 519.

Figure 6:
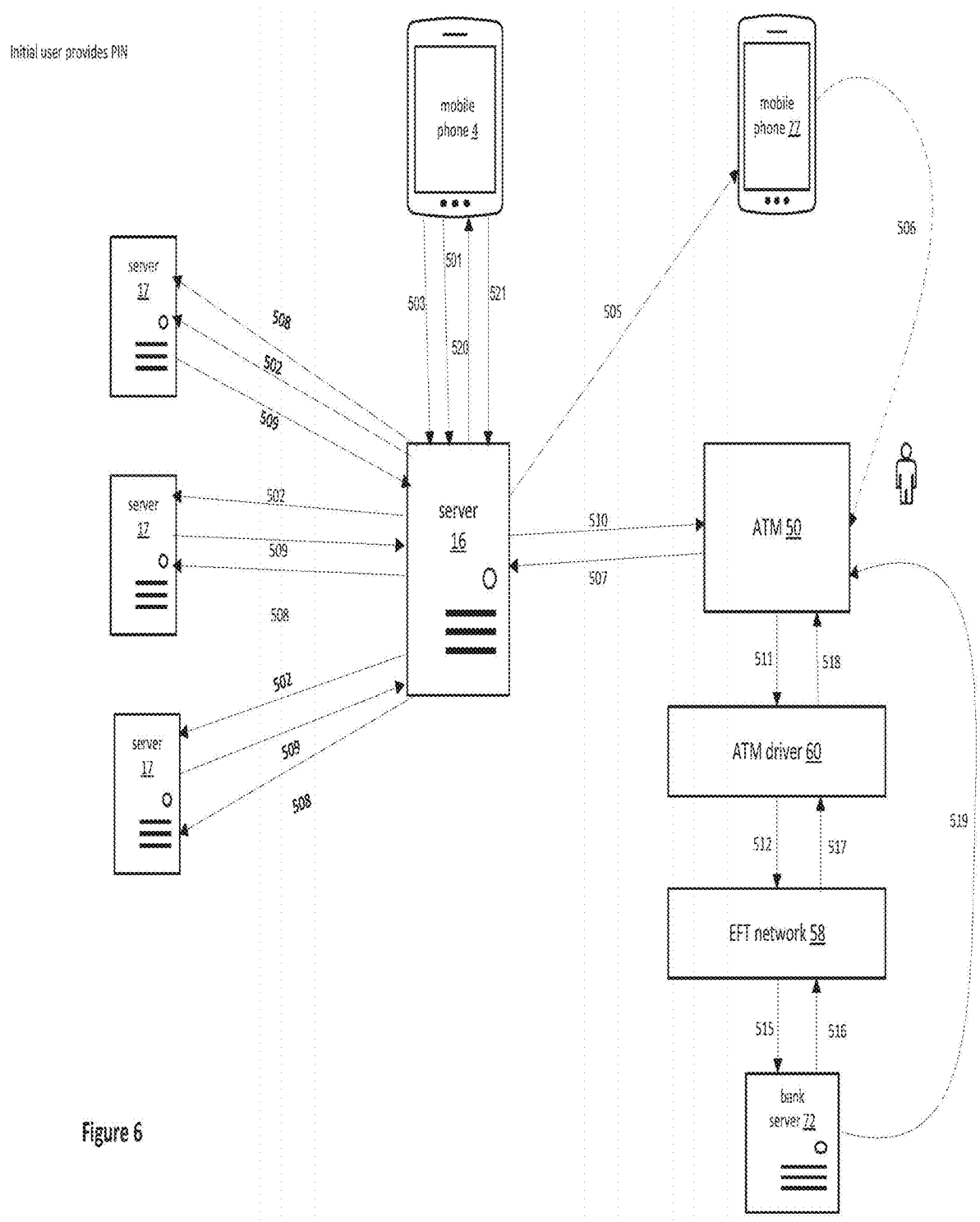
FIG. 6 shows an embodiment wherein the user is requested to enter user-identification data.

FIG. 6 shows an embodiment wherein instead of entering a user-identification data subset (while creating a financial-transaction data set) at the time of pre-staging a financial transaction, the user is requested to enter the user-identification data subset, e.g., the user's PIN (using the user's computing device 4), in response to the recipient initiating a pre-staged financial transaction by entering a financial-transaction token into ATM 50 configured to receive it. In response to recipient initiating a pre-staged financial transaction by a entering financial-transaction token into ATM 50, a request is directly or indirectly sent from ATM 50 to the user's computing device 4 (requesting that the user input and submit the user-identification data subset) via data transfer PIN request 507 and 520. In response to the request, and upon inputting and the submitting user-identification data subset, the user-identification data subset is sent to ATM 50 via PIN data transfer 521 and 510. By inputting and submitting the user-identification data subset in response to the request, the user is confirming that pre-staged transaction will proceed.

Figure 7:
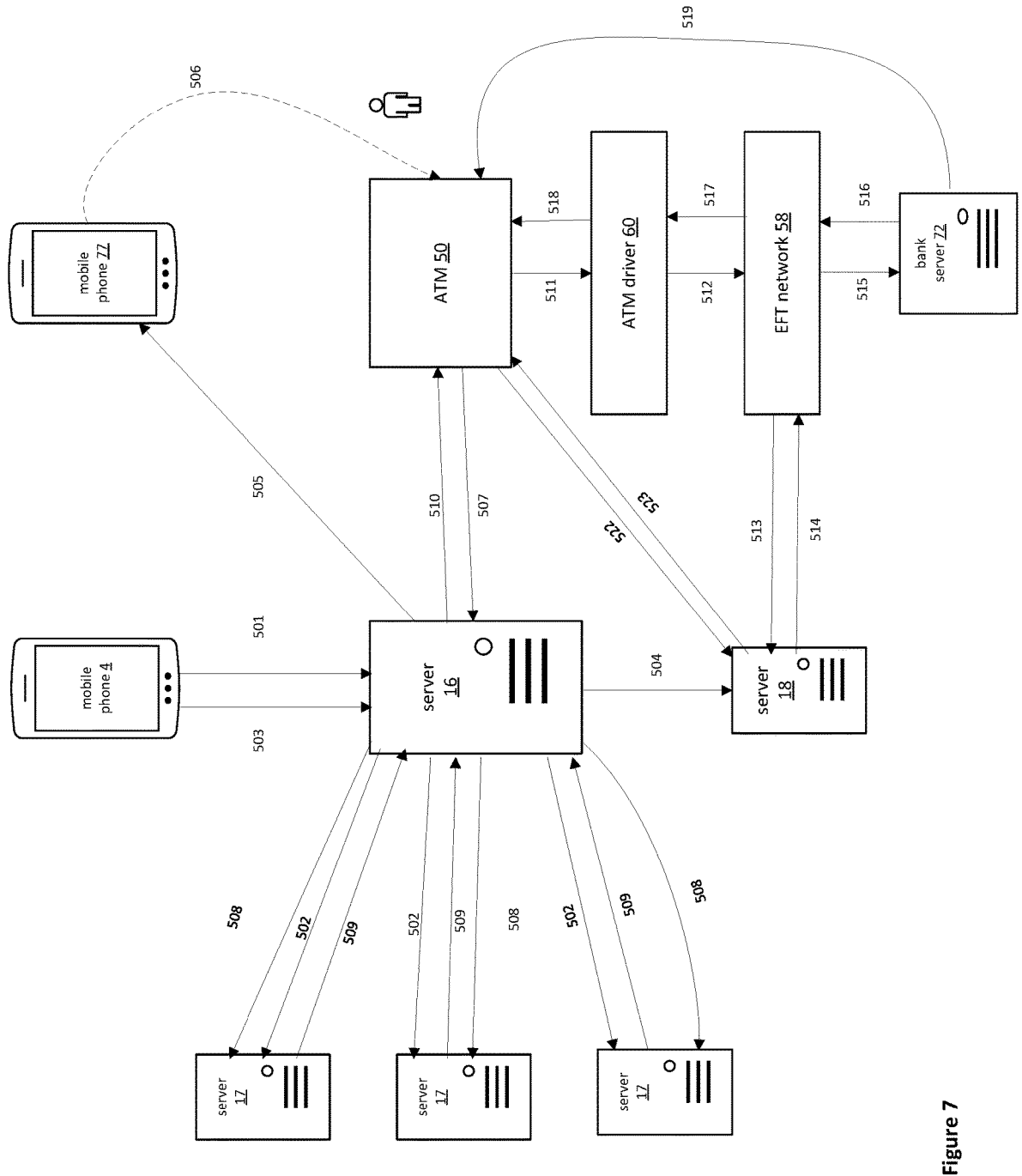
FIG. 7 shows an embodiment wherein a financial transaction token is sent from an ATM to a server via data transfer.

FIG. 7 shows an embodiment wherein instead of a financial transaction token being sent from EFT network 58 to server 18 via data transfer 513, the financial transaction token is sent from ATM 50 to server 18 via data transfer 522. In response to receiving the financial transaction token, server 18 sends decrypted user identification data subset 64 to ATM 50 via data transfer 523. In this embodiment, the financial transaction token is sent from ATM 50 to server 18 in response to ATM 50 receiving the mobile-wallet account, portions of the financial-transaction data set, and the user-identification token via data transfer 510. And because ATM 50 requests and receives decrypted user identification data subset 64 via data transfers 522 and 523 respectively, data transfers 522 and 523 obviate the need for data transfers 513 and 514 (between EFT network 58 and server 18).

Figure 8:
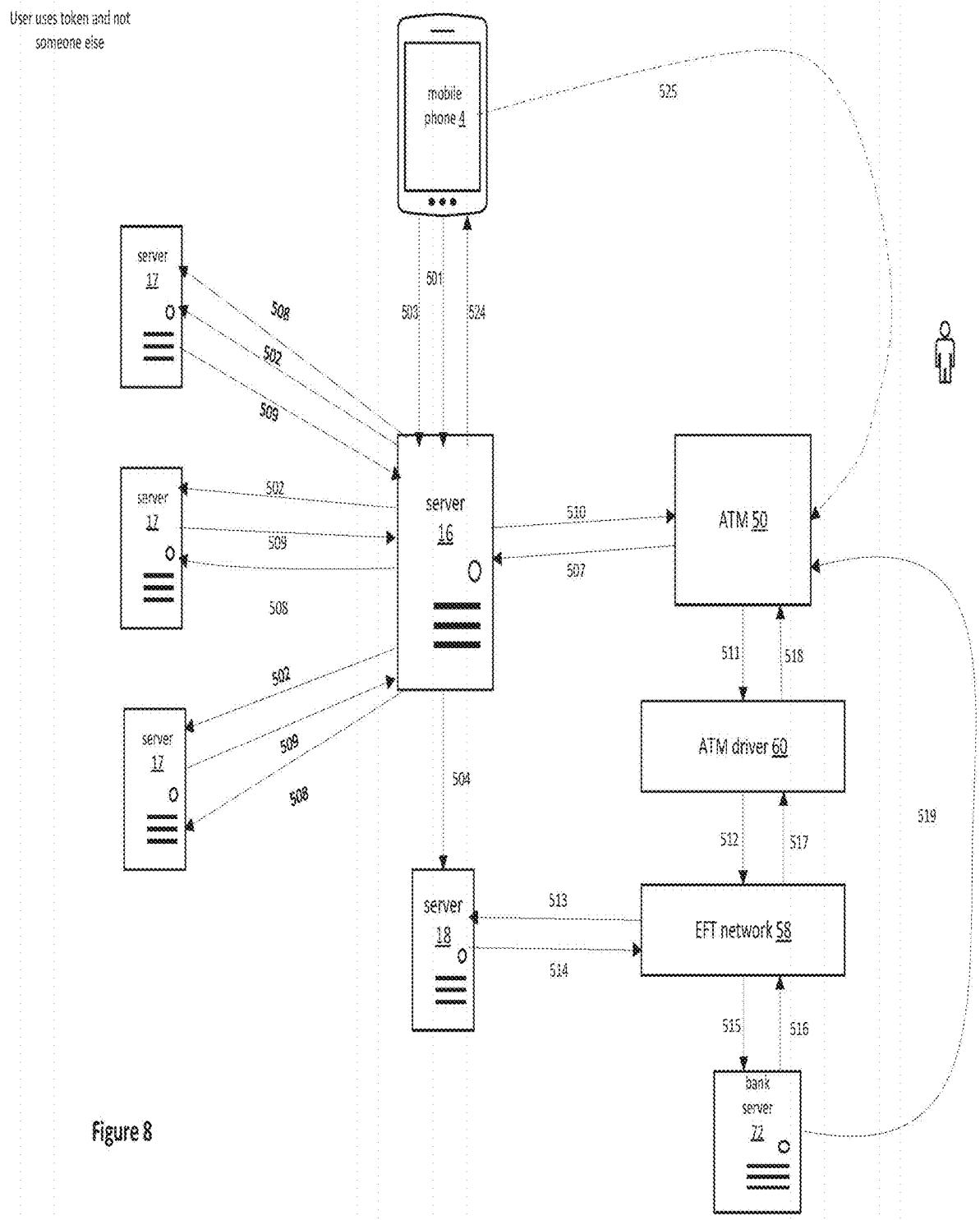
FIG. 8 shows an embodiment wherein the user pre-stages and subsequently receives a financial transaction token for the user's own personal use.

FIG. 8 shows an embodiment wherein the user pre-stages and subsequently receives a financial transaction token for the user's own personal use. In this embodiment, the financial transaction token is sent from server 16 to the user's mobile phone 4 via data transfer 524. The user may then initiate a pre-staged financial transaction by physically going to ATM 50 and inputting the financial transaction token into ATM 50.

FIG. 9 shows an embodiment directed to a user that has pre-staged a plurality of financial transactions, wherein each pre-staged financial transaction respectively has an independent financial transaction token associated with it. As shown in FIG. 9, each intended recipient of the plurality of pre-staged financial transactions receives their respective financial transaction token via their mobile phone 77. As a non-limiting example, FIG. 9 shows three separate mobile phones 77 respectively receiving an independent financial transaction token via data transfers 505A, 505B, and 505C. As shown in elements 506A, 506B, and 506C—each of the mobile phone owners/recipients then goes to ATM 50 and inputs their respective financial transaction token 32 into ATM 50 to initiate their respective pre-staged financial transaction. Each respective pre-staged financial transaction is initiated as each of the respective tokens is input into ATM 50. As a non-limiting example, this embodiment could be used to handle payroll using a plurality of financial transaction tokens in place of paper checks or cash.

Figure 10:
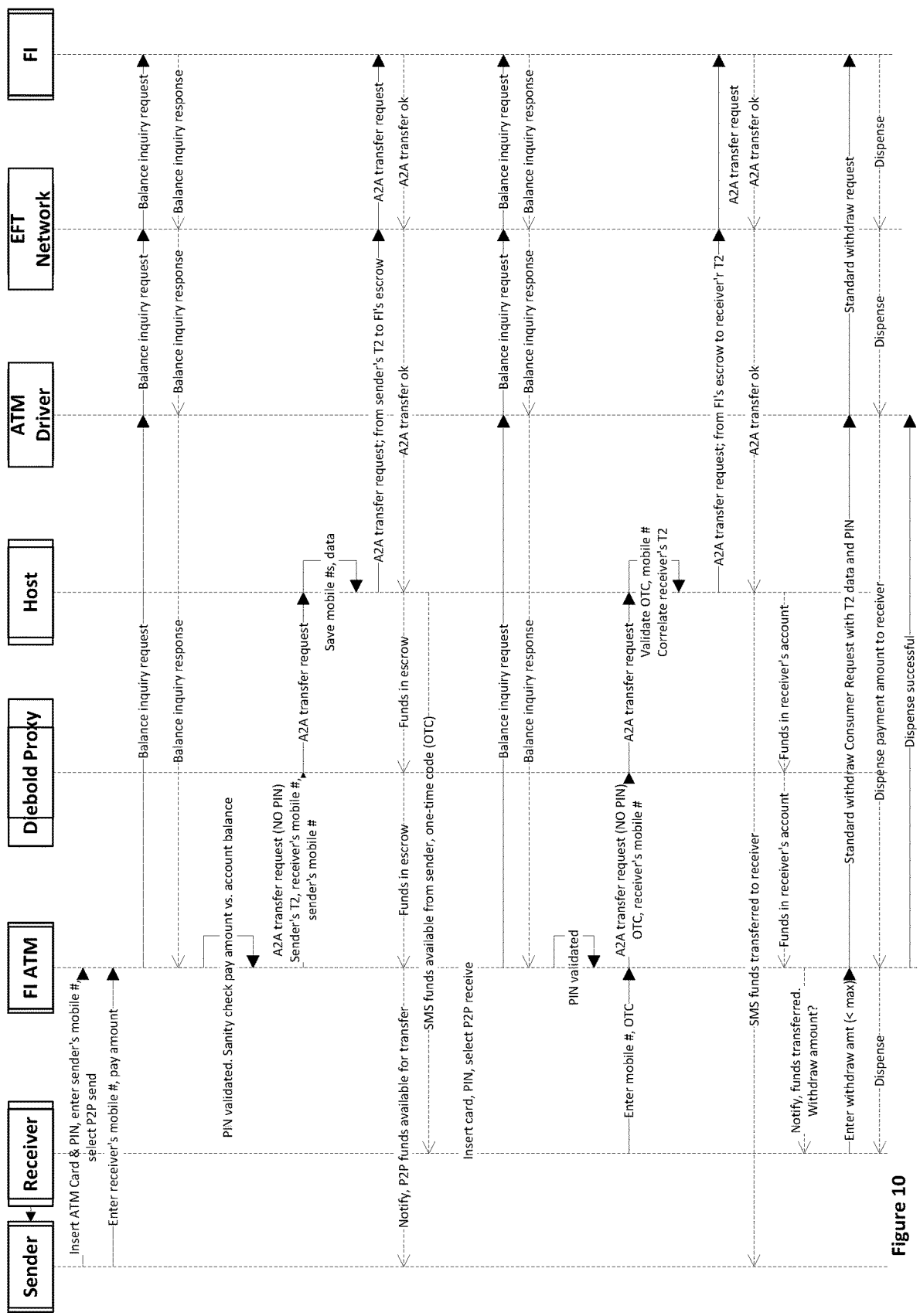
FIG. 10 shows an embodiment for pre-staging, initiating, and completing pre-staged financial transaction 46 between a currency sender and receiver.

FIG. 10 shows an embodiment for pre-staging, initiating, and completing a pre-staged financial transaction between a currency sender and receiver. FIG. 10 qualifies the user as the "sender"; and the currency recipient is qualified as the "receiver." The temporal sequence of events shown in FIG.

10 begins with a pre-staging financial transaction and ends with completion of the transaction. FIG. 10 should be interpreted with the understanding that the beginning of the embodiment is shown at the top of FIG. 10 and the end of the embodiment is shown at the bottom of FIG. 10. Furthermore, the beginning stem of an arrow shows the origin of an act, event, or data transfer, and the end point of the arrowhead shows the destination or receiving device of the particular act, event, or data transfer. As a non-limiting example, the first event shown in FIG. 10 is represented by the upper-most arrow at the top of FIG. 10 and shows an initial action taken by the sender and described as, "Insert ATM Card & PIN, enter sender's mobile #, select P2P send"; this action is shown by the arrow as being taken by the Sender at the Financial Institution ATM (FI ATM). Arrows consecutively beneath this first arrow respectively represent the next and consecutive acts, events, or data transfers in the embodiment. The end of the embodiment is shown by the arrow at the bottom of FIG. 10 and shows a message or data transfer being sent from the FI ATM to the ATM Driver, wherein the message is "Dispense successful".

While principals and modes of operation have been explained and illustrated with regard to particular embodiments, it must be understood, however, that this may be practiced otherwise than as specifically explained and illustrated without departing from its spirt or scope.

What is claimed is:

1. A method, comprising:
receiving, by a first server and from a user device initiating a transaction, data representative of a financial transaction, the data representative of a financial transaction comprises data representative of a user initiating the financial transaction, data representative of an amount, and data representative of a recipient of the financial transaction, the data representative of a recipient including an electronic address associated with the recipient;
generating, by the first server, a token associated with the data representative of the financial transaction;
storing, by the first server, the token;
sending, by the first server, a copy of the token to the electronic address associated with the recipient;
receiving, by the first server and from an automated banking machine, data representative of the token, wherein the automatic banking machine receives the token from a device of the recipient;
sending, by the first server and to the user device, a request for a user identification data subset in response to receiving the data representative of the token from the automated banking machine;
receiving, by the first server and from the user device, the user identification data subset in response to the request for the user identification data subset;
sending, by the first server and to the automated banking machine, the user identification data subset in response to receiving the user identification data subset from the user device;
sending, by the automated banking machine and to an automated teller machine driver, an automated teller machine transmission message and the user identification data subset, wherein the automated teller machine transmission message comprises the data representative of the token;
forwarding, by the automated teller machine driver, the automated teller machine transmission message and the user identification data subset to an electronic funds transfer network;
sending, by the electronic funds network and to a third server associated with a financial institution, the user identification data subset and portions of the automated teller machine transmission message; and
receiving, by the automated banking machine and from the third server, a transaction acceptance message associated with the token;
dispensing, by the automated banking machine, an amount of currency corresponding to the data representative of the amount in response to receiving the transaction acceptance message.

2. The method according to claim 1, wherein the recipient is the same as the user.

3. The method according to claim 1, wherein the amount of the token is for a fixed amount.

4. The method according to claim 1, wherein the token allows for a plurality of withdrawals of variable amounts, wherein the sum of the withdrawals is allowed up to a fixed amount.

5. The method according to claim 1, wherein the token allows for withdrawals of a fixed amount for a plurality of time periods.

6. The method according to claim 1, wherein a plurality of tokens are generated; wherein the plurality of tokens are sent to multiple recipients.

7. The method according to claim 6, wherein at least two of the plurality of tokens are for different amounts.

8. The method according to claim 1, wherein the token can be used for a fixed number of transactions.

9. The method according to claim 1, wherein the data representative of the user further comprises biometric data, the method further comprises validating, by the automated teller machine, the received user identification data subset with the biometric data for the received data representative of the token.

10. The method according to claim 1, wherein the token is an alphanumeric character string.

11. The method according to claim 1, further comprising:
receiving, by the first server, data representative of a mobile wallet-account; and
storing, by the first server, the data representative of the mobile-wallet account;
wherein the user identification token is obtained from the mobile-wallet account.

12. The method according to claim 11, wherein the mobile-wallet account comprises data representative of financial account data and data representative of personal data for the user.

* * * * *